United States Patent
Rinker

(10) Patent No.: US 9,610,907 B2
(45) Date of Patent: Apr. 4, 2017

(54) SYSTEM AND METHOD FOR DECIDING WHEN ACCESSORIES ARE ENGINE DRIVEN AND WHEN THEY ARE ALTERNATIVELY DRIVEN

(71) Applicant: Cummins, Inc., Columbus, IN (US)

(72) Inventor: Jeffrey W. Rinker, Tralalgar, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 14/790,670

(22) Filed: Jul. 2, 2015

(65) Prior Publication Data

US 2017/0001581 A1    Jan. 5, 2017

(51) Int. Cl.
*B60R 16/03*    (2006.01)
*F02D 41/04*    (2006.01)

(52) U.S. Cl.
CPC .............. *B60R 16/03* (2013.01); *F02D 41/04* (2013.01)

(58) Field of Classification Search
CPC ............. G06F 7/00; B60W 10/24; B60K 6/04
See application file for complete search history.

(56) References Cited

U.S. PATENT DOCUMENTS

| | | | |
|---|---|---|---|
| 6,242,873 B1 * | 6/2001 | Drozdz | B60K 6/46 180/65.1 |
| 7,004,273 B1 * | 2/2006 | Gruenwald | B60K 6/46 180/65.245 |
| 7,252,165 B1 * | 8/2007 | Gruenwald | B60L 1/003 180/65.25 |
| 7,308,883 B2 | 12/2007 | Suzuki | |
| 7,492,055 B2 * | 2/2009 | Chiao | B60K 6/46 307/9.1 |
| 7,690,451 B2 | 4/2010 | Chiao | |
| 7,748,483 B2 | 7/2010 | Usoro | |
| 7,753,147 B2 | 7/2010 | Usoro | |
| 8,978,798 B2 * | 3/2015 | Dalum | B60K 6/12 180/65.22 |
| 9,043,085 B2 * | 5/2015 | Sisk | B60W 10/24 701/36 |
| 9,221,451 B2 * | 12/2015 | Ahn | B60W 10/023 |
| 9,283,954 B2 * | 3/2016 | Dalum | B60W 20/12 |
| 2008/0224663 A1 | 9/2008 | Mack | |
| 2010/0039054 A1 * | 2/2010 | Young | B60L 11/08 318/376 |
| 2011/0029208 A1 * | 2/2011 | Xia | B60K 6/445 701/58 |
| 2011/0190083 A1 | 8/2011 | Harrison et al. | |
| 2013/0179007 A1 * | 7/2013 | Dalum | H01M 16/006 701/2 |
| 2015/0002056 A1 * | 1/2015 | Young | B60L 11/08 318/376 |

* cited by examiner

*Primary Examiner* — Thomas Tarcza
*Assistant Examiner* — Alex C Dunn
(74) *Attorney, Agent, or Firm* — Foley & Lardner LLP

(57) ABSTRACT

An apparatus includes an engine module, an energy module, and an interface module. The engine module is structured to interpret engine data indicative of operation of an engine. The energy module is structured to interpret energy data indicative of an amount of energy stored in an energy storage device. The energy storage device is coupled to an accessory motor and structured to selectively power the accessory motor. The interface unit module is structured to control power transmission from at least one of the engine and the accessory motor to at least one accessory via an interface unit responsive to the engine data and the energy data.

25 Claims, 9 Drawing Sheets

SYSTEM AND METHOD FOR DECIDING WHEN ACCESSORIES ARE ENGINE DRIVEN AND WHEN THEY ARE ALTERNATIVELY DRIVEN

BACKGROUND

Mechanically-driven vehicle accessories have traditionally been belt driven or gear driven from the engine. These accessories include air compressors (for pneumatic devices), air conditioning, power steering pumps, engine coolant pumps, fans, etc. Often, these accessories are designed to operate at lower engine speeds, such as at an engine idle condition. As a result, when the engine operates at higher speeds, the accessories may operate at inefficient operating bands. Furthermore, mechanically-driven vehicle accessories are usually unable to be powered while the engine is off. This may cause high priority accessories to be unable to perform necessary functions after a vehicle has been driven and the engine has been turned off (such as a water pump used to cool the engine).

SUMMARY

One embodiment relates to an apparatus. The apparatus includes an engine module, an energy module, and an interface module. The engine module is structured to interpret engine data indicative of operation of an engine. The energy module is structured to interpret energy data indicative of an amount of energy stored in an energy storage device. The energy storage device is coupled to an accessory motor and structured to selectively power the accessory motor. The interface unit module is structured to control power transmission from at least one of the engine and the accessory motor to at least one accessory via an interface unit responsive to the engine data and the energy data. According to one embodiment, the interface unit is situated as an intermediary between the at least one accessory and each of the engine and the accessory motor.

Another embodiment relates to a system. The system includes an engine; an accessory motor coupled to an energy storage device; an interface unit coupled to each of the engine and the accessory motor, the engine not being directly coupled to the accessory motor; at least one accessory coupled to the interface unit; and a controller communicably coupled to the engine, the accessory motor, the energy storage device, the interface unit, and the at least one accessory. The controller is structured to: receive engine data indicative of operation of the engine; receive energy data indicative of an amount of energy stored in the energy storage device; and selectively control power transmission from at least one of the engine and the accessory motor to the at least one accessory via the interface unit responsive to the engine data and the energy data. According to one embodiment, the engine is not directly coupled to the accessory motor. Rather, the interface unit is structured as an intermediary between the engine and the accessory motor.

Another embodiment relates to a method. The method includes providing an interface unit coupled to both an engine and an accessory motor in a vehicle; receiving, by a controller, engine data indicative of operation of the engine; receiving, by the controller, energy data indicative of an amount of energy stored in an energy storage device, wherein the energy storage device is coupled to the accessory motor; and controlling, by the controller, power transmission from at least one of the engine and the accessory motor via the interface unit to at least one vehicle accessory responsive to the engine data and the energy data.

These and other features, together with the organization and manner of operation thereof, will become apparent from the following detailed description when taken in conjunction with the accompanying drawings.

DETAILED DESCRIPTION

Figure 1:
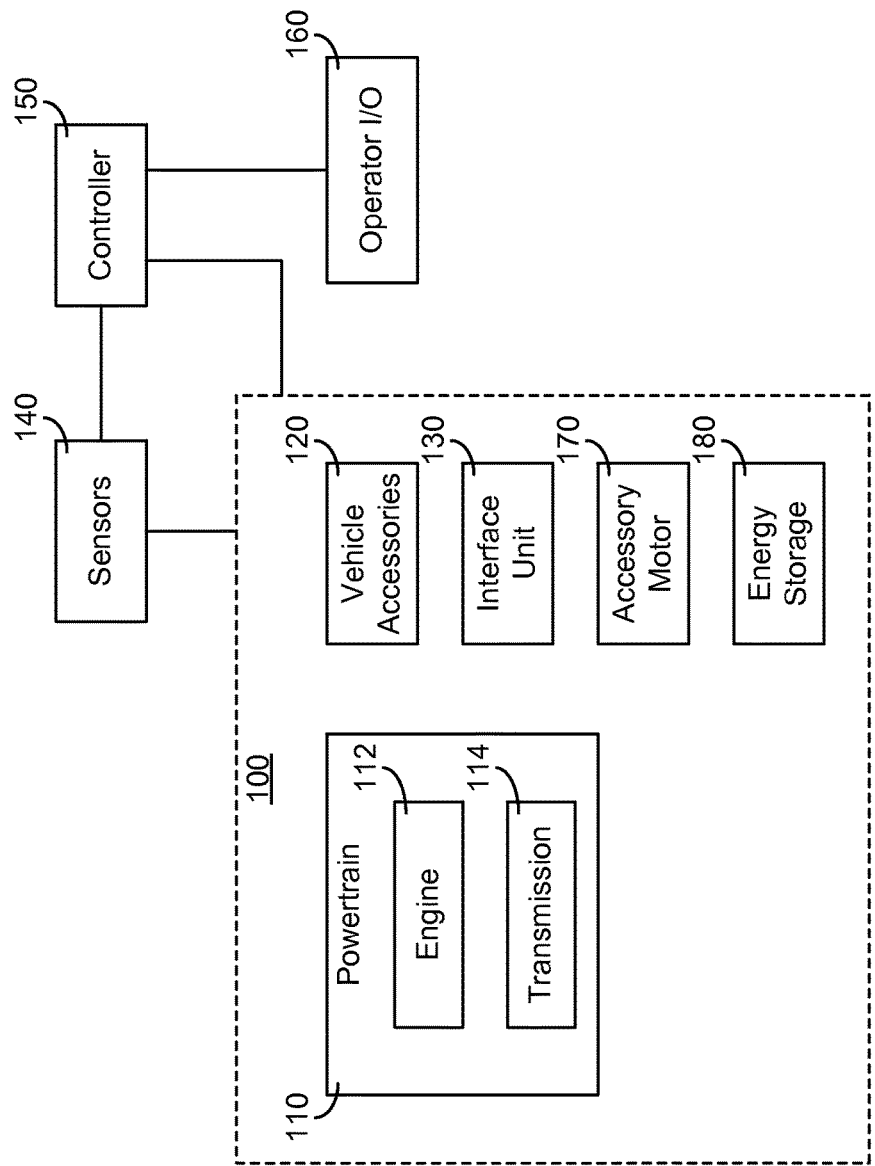
FIG. 1 is a schematic diagram of a vehicle with a controller, according to an example embodiment.

Referring to Figures generally, the various embodiments disclosed herein relate to systems and methods for determining when accessories should be engine driven and when the vehicle accessories should be alternatively driven (e.g., by an accessory motor). According to one embodiment, the systems and methods described herein are implemented with a vehicle such that the accessories refer to vehicle accessories and the engine refers to an engine of the vehicle. Accordingly, the vehicle accessories may include, but are not limited to, air compressors (for pneumatic devices), air conditioning systems, power steering pumps, engine coolant pumps, water pumps, fans, and the like.

According to the present disclosure, a system includes accessories, an engine, an interface unit, an accessory motor, and a controller. The accessory motor is structured to provide power to the engine mounted accessories that are both gear driven and belt driven, provide torque to start the engine, and provide energy for storage to an energy storage device like a traditional automotive-style alternator. According to one embodiment, the system is embodied in a vehicle, such that the accessories are vehicle accessories. The vehicle accessories are structured to be driven via the interface unit. According to one embodiment, the interface unit is mechanically-based. As such, the interface unit includes a variety of mechanical devices including, but not limited to, multiple gear ratios and actuators that facilitate power transmission between the engine, accessory motor, and the vehicle accessories. According to the present disclosure, the interface unit serves as intermediary between the vehicle accessories and the engine and accessory motor (e.g., the engine and accessory motor are not directly coupled and neither is directly coupled to the vehicle accessories). The controller is structured to control whether the engine, the accessory motor, or a combination of both of the engine and the accessory motor provide power to one or more of the vehicle accessories. According to the present disclosure, the systems and methods described herein are used to determine an efficient drive mode of operation for the system based on various vehicle and component operating parameters, such as engine speed and an amount of stored energy. The controller may also operate dynamically responsive to various environmental data (e.g., weather conditions, road grade changes, road curvature, etc.) to allow for the accessory motor to power the vehicle accessories when the engine is required to output substantial loads (e.g., above a predefined threshold) in order to propel the vehicle. Technically and advantageously, the present disclosure provides for efficient operation of the vehicle accessories coupled to the interface (e.g., operated substantially only at speeds within their designed range, etc.), which increases the efficiency of the system and reduces wear and tear that may reduce service costs while not implementing complex control strategies with each accessory or making substantial hardware changes. Advantageously and accordingly, the system and method of present disclosure can therefore modular with respect to a variety of system configurations.

As an example, a diesel engine and an accessory motor with energy storage capabilities are connected via a mechanically actuated interface unit that is also coupled to a vehicle accessory, such as a water pump. When the accessory motor has a sufficient amount of stored energy (e.g., a substantial state of charge to a predetermined threshold level that indicates a sufficient amount, etc.), the accessory motor may provide power to the interface unit which powers the water pump to cool the engine. On the other hand, if the stored energy is not sufficient (e.g., below a predetermined threshold), the engine may provide the power to the water pump. While the engine drives the vehicle accessory, the engine may also drive the accessory motor to generate electricity that is stored for future use. In some cases, both the engine and the accessory motor may jointly provide power to the interface unit to power the water pump. Since electric motors cannot operate as a motor and a generator at the same time, a decision logic may be implemented with the controller to decide when the electric motor functions as a motor to power the vehicle accessory and when the electric motor operates as an alternator. Accordingly, the present disclosure describes a control strategy that considers various pieces of engine information, vehicle information, and battery information to decide an optimal mode of operation where the mode of operation refers to how a vehicle accessory is powered (e.g., solely from the engine, solely from the accessory motor, or a combination of power from both the engine and the accessory motor). Therefore, as mentioned above, the present disclosure provides a system and method to control one or more vehicle accessories to operate in their designed operating range (e.g., a designed amount of powering torque, a designed amount of electrical power, etc.) to avoid over/under powering these components because over/under powering these components may cause unnecessary wear and reduce their effective life. As a result, the systems and methods described herein provide a technical advantage over conventional systems that fail to consider, appreciate, and control vehicle accessories within their intended operating ranges.

Referring now to FIG. 1, a schematic diagram of a vehicle 100 with a controller 150 is shown, according to an example embodiment. The vehicle 100 may be an on-road or an off-road vehicle including, but not limited to, line-haul trucks, mid-range trucks (e.g., pick-up truck), tanks, airplanes, and any other type of vehicle that utilizes vehicle accessories. Although FIG. 1 depicts the vehicle 100 as including an internal combustion engine 112, the vehicle 100 may be powered by any type of engine system. For example, the vehicle 100 may be a hybrid vehicle, a full electric vehicle, and/or an internal combustion engine powered vehicle as shown.

As shown, the vehicle 100 generally includes a powertrain system 110, vehicle accessories 120, an interface unit 130, an accessory motor 170, an energy storage device 180, sensors 140 communicably coupled to one or more components of the vehicle 100, a controller 150, and an operator input/output (I/O) device 160. While the sensors 140, controller 150, and operator I/O device 160 are shown external to the vehicle 100, this is done for clarity and is not intended to be limiting. Accordingly, in some embodiments, all of these components may be included with the vehicle 100.

Communication between and among the components of the vehicle 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data from one or more of the components shown in FIG. 1. For example, the data may include operating data (e.g., engine speed, vehicle speed, engine temperature, battery levels, etc.) received via one or more sensors, such as sensors 140. As another example, the data may include an input from operator I/O device 160. As described more fully herein, with this data, the controller 150 dynamically determines to operate a vehicle accessory 120 with the engine 112, the accessory motor 170, or a combination of the two.

As shown in FIG. 1, the powertrain system 110 includes an engine 112 and a transmission 114. Although not depicted, the powertrain system 110 may also include a drive shaft, a differential, and a final drive. As a brief overview, the engine 112 receives a chemical energy input (e.g., a fuel such as gasoline, diesel, etc.) and combusts the fuel to generate mechanical energy, in the form of a rotating crankshaft. The transmission 114 receives the rotating crankshaft and manipulates the speed of the crankshaft (i.e., the engine revolutions-per-minute (RPM)) to affect a desired drive shaft speed. The rotating drive shaft is received by the differential, which provides the rotational energy of the drive shaft to the final drive. The final drive then propels or moves the vehicle 100.

The engine 112 may be structured as any internal combustion engine (e.g., compression-ignition or spark-ignition), such that it can be powered by any fuel type (e.g., diesel, ethanol, gasoline, etc.). Similarly, the transmission 114 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 112 and the transmission 114, the drive shaft, differential, and final drive may be structured in any configuration dependent on the application (e.g., the final drive is structured as wheels in an automotive application and a propeller in an airplane application, etc.). Further, the drive shaft may be structured as any type of drive shaft including, but not limited to, a one-piece, a two-piece, and a slip-in-tube driveshaft based on the application.

As mentioned above, the vehicle 100 includes vehicle accessories 120. According to one embodiment, the vehicle accessories 120 include mechanically-powered or driven vehicle accessories such as a heating, ventilation, and air condition (HVAC) compressor, a water pump, a brake air compressor, a power steering pump, Power Take Off (PTO) shafts, hydraulic pumps, other chemical pumps, and/or any other vehicle accessory that may be powered mechanically. In other embodiments, the vehicle accessories may also be pneumatically-powered, hydraulically-powered, electrically-powered, or still otherwise powered. The accessories receive power via the interface unit 130 from at least one of the engine 112 and the accessory motor 170. As described more fully herein, the controller 150 regulates/manages the power delivered from at least one of the engine 112 and the accessory motor 170 to the vehicle accessories 120.

The interface unit 130 is structured as intermediary unit between the vehicle accessories 120 and each of the engine 112 and the accessory motor 170. In one embodiment, the interface unit 130 is structured as a mechanical interface unit. In this configuration, the interface unit 130 may include any one or more of a variety of mechanical devices which may be used to interface between the engine 112, the accessory motor 170, and the vehicle accessories 120. For example, the interface unit 130 may include one or more gearboxes that include one or more gear trains corresponding to variety of gear ratios, a clutch, a mechanical actuator (e.g., a movable shaft, a piston-cylinder arrangement, etc.), and any other type of mechanical component. In other embodiments, the interface unit 130 may include pneumatic, hydraulic, and/or electrical components for transmitting power to pneumatic, hydraulic, and/or electric driven vehicle accessories. In some embodiments, the interface unit 130 may include a combination of different types of power transmission devices for transmitting power between the accessory motor, engine and various vehicle accessories. For example, the interface unit may include both electrical and mechanical coupling devices. In an example with a pneumatic interface unit, the interface unit 130 may be used to drive pneumatic vehicle accessories, such as air brakes on a semi-tractor trailer.

According to one embodiment, the accessory motor 170 and the engine 112 are not directly connected. Rather, the interface unit 130 provides the only source of coupling between the engine 112 and the accessory motor 170. In an alternate embodiment, the accessory motor 170 and engine 112 may be directly coupled to provide a redundancy configuration if the interface unit 130 were to fail.

The accessory motor 170 is structured to provide an alternate drive system (relative to the power provided by the engine 112) for the vehicle accessories 120 (e.g., an electric accessory drive (EAD), etc.). The accessory motor 170 may directly or indirectly facilitate the providing of any power type including, but not limited to, air (e.g., pneumatic, etc.), electric (e.g., an electric motor, etc.), fluid (e.g., hydraulic cylinders, etc.), mechanical (e.g., a flywheel, etc.), and the like. In one embodiment, the accessory motor is structured as an electric motor (e.g., alternating current (AC) motor, direct current motor (DC), etc.). An electric motor is an electric device that converts electrical energy into mechanical energy. In a motoring mode, the electric motor operates via the interaction between the electric motor's magnetic field and winding currents to generate a mechanical force within the motor (i.e., converting electrical energy into mechanical energy). In certain applications, the electric motor may operate in a generating mode to produce electrical energy from a mechanical energy input. A generator works on the principle of electromagnetic induction. A flow of electric charges may be induced by moving an electrical conductor via the mechanical energy input, such as a wire that contains electric charges, in a magnetic field. This movement creates a voltage difference between the two ends of the wire or electrical conductor, which in turn causes the electric charges to flow, thus generating electric current. The generated electrical current may be stored as electrical energy in a storage system, like that of energy storage device 180, for future use.

The accessory motor 170 is electromechanically coupled to the interface unit 130 such the accessory motor 170 is structured to operate within a variety of modes of operation for the system. The modes in which the accessory motor 170 may operate include a first mode where the accessory motor 170 operates as a generator to recharge the energy storage device 180. As a brief overview, in the first mode of operation, the engine 112 may drive both the accessory motor 170 and the vehicle accessories 120 via the interface unit 130. In this configuration, the accessory motor 170 may take the place of a traditional alternator in an internal combustion engine setup and act as a generator to resupply or charge the energy storage device 180. The modes may also include a second mode where the accessory motor 170 operates as a motor to provide torque to the vehicle accessories 120. In the second mode of operation, the accessory motor 170 may provide all of the torque to operate the vehicle accessories 120 through the interface unit 130 by using stored energy within the energy storage device 180 (e.g., accumulated during the first mode of operation, etc.). The modes may still further include a third mode where the accessory motor 170 operates as a motor to provide engine starting torque to start the engine 112. Each of the modes is described more fully herein. It should be understood that in some embodiments, the interface unit 130 is driven by a combination of the engine 112 and the accessory motor 170 such that a blended power source is provided (e.g., 50% engine and 50% motor, 80% engine and 20% motor, etc.) to at least one accessory 120.

The energy storage device 180 may be structured as any type of device that may store energy for use at a future time. In one embodiment, the energy storage device 180 may be structured as a rechargeable electric battery system. A rechargeable battery includes one or more electrochemical cells and is a type of energy accumulator used for electrochemical energy storage. The stored electrochemical energy may be converted into electrical energy at a later time to perform some useful purpose. When a battery is attached to a motor with both motoring and generating capabilities, it may be charged and discharged. For example, when the accessory motor 170 is in a generating mode, the battery may convert the electrical energy provided by the accessory motor 170 and store it as chemical energy (i.e., a charge for the battery). When the accessory motor 170 is in a motoring mode, the battery may supply the stored chemical energy to the accessory motor 170 by converting the stored energy to electrical energy to operate the accessory motor 170 (i.e., discharging the battery) as an EAD. In one embodiment, the energy storage device 180 may be used for various actions depending on the mode of operation of the system. During the first mode of operation, the energy storage device 180 stores excess energy (generated by the accessory motor 170 as mentioned above). The excess energy is energy supplied by the engine 112 which is not needed to operate the vehicle 100 (e.g., the vehicle accessories 120, etc.). During the second mode of operation, the energy storage device 180 supplies energy to the accessory motor 170 to power the vehicle accessories 120. During the third mode of operation, the energy storage device 180 supplies energy to the accessory motor 170 to maintain the required torque to power the vehicle accessories 120 and/or engage the starting mechanism to start the engine 112.

The operator I/O device 160 enables an operator of the vehicle 100 (or another passenger; or, manufacturing, service, or maintenance personnel) to communicate with the vehicle 100 and the controller 150. For example, the operator I/O 160 may include, but is not limited, an interactive display, a touchscreen device, one or more buttons and switches, voice command receivers, etc. Via the operator I/O device 160, the user may turn on various vehicle accessories 120 and otherwise control various vehicle accessories 120. For example, a user may turn on the air conditioning in the vehicle 100. This action may then cause the engine 112, the accessory motor 170, or a combination of the two to provide the necessary power to the interface unit 130 to power the HVAC compressor in order to operate the vehicle's air conditioning.

As the components of FIG. 1 are shown to be embodied in a vehicle 100, the controller 150 may be structured as an electronic control module (ECM). The ECM may be separate from or included with any type of control unit included with a vehicle such as a transmission control unit, an exhaust aftertreatment control unit, a powertrain control module, an engine control module, etc. In other embodiments, the controller 150 may be integrated with the interface unit 130. The function and structure of the controller 150 is described in greater detail in FIG. 2. All such variations are intended to fall within the spirit and scope of the present disclosure.

Figure 2:
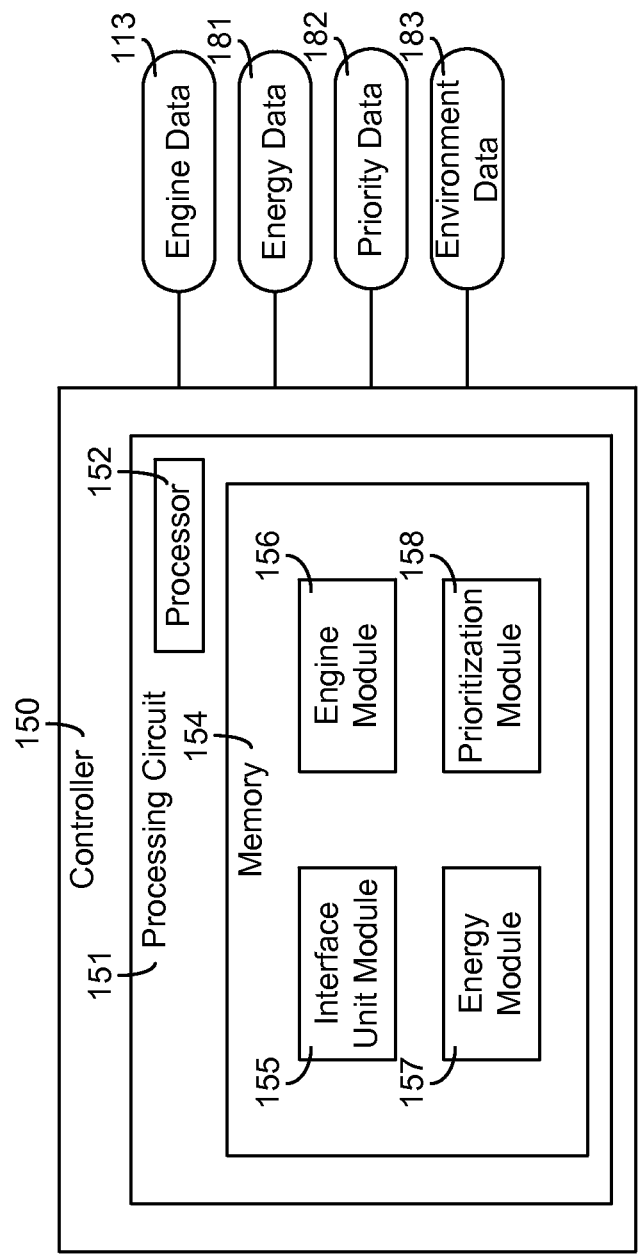
FIG. 2 is a schematic of a controller used with the vehicle of FIG. 1, according to an example embodiment.

Referring now to FIG. 2, the function and structure of the controller 150 are shown according to one embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules structured to control the vehicle accessories 120. While various modules with particular functionality are shown in FIG. 2, it should be understood that the controller 150 and memory 154 may include any number of modules for completing the functions described herein. For example, the activities of multiple modules may be combined as a single module, additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown, the controller 150 includes an interface unit module 155, an engine module 156, an energy module 157, and a prioritization module 158. The engine module 156 is structured to receive and store engine data 113. The engine data 113 provides an indication of various engine characteristics of the engine 112. In one configuration, one or more sensors 140 may be communicably coupled to the engine 112 and the controller 150. The sensors 140 may acquire the engine data 113. The sensors 140 may include an engine speed sensor, an engine torque sensor, an oxygen sensor, a fuel sensor (e.g., a fuel injection monitor), an engine temperature sensor (e.g., on the block of the engine, near the exhaust valve of the engine to monitor an exhaust gas temperature, and any other location), etc. Accordingly, the engine data 113 may include, but is not limited to, an engine speed (revolutions-per-minute (RPM)), an engine output power, an engine temperature, a state of the engine (e.g., ON or OFF), an engine load, and/or any other engine characteristics. In one embodiment, the engine module 156 may monitor engine speed to determine whether the speed of the engine 112 is less than an engine speed threshold. By way of example, a substantially high engine speed (e.g., above an engine speed threshold such as 2500 RPM, etc.) may cause inefficient operation or even affect the integrity of the vehicle accessories 120. Therefore, the operation of the vehicle accessories 120 with the engine 112 may be responsive to a comparison of the engine speed with an engine speed threshold. The engine data 113 received by the engine module 156 may be used by the other modules, such as the prioritization module 158, which is described more fully herein.

The energy module 157 is structured to receive and store energy data 181 regarding the energy storage device 180. The energy data 181 is indicative of a characteristic of the energy storage device 180 (e.g., percent charged/discharged, state of charge, etc.). In one configuration, the one or more sensors 140 may also be communicably coupled to the energy storage device 180. Accordingly, the sensors 140 may include, but are not limited to, a temperature sensor, a voltage sensor (e.g., to measure or determine voltage across the energy storage device), a current sensor (e.g., to measure or determine a current flow into and out of the energy storage device such as a current shunt), etc. In one embodiment, the energy storage device 180 is structured as a rechargeable battery. Therefore, the sensors 140 may acquire energy data 181 including, but not limited to, a battery temperature, an input/output voltage, an input/output current, a battery load, a discharge rate, a frequency of use, a length of use, an intensity of use, and the like. Based on the energy data 181, the energy module 157 may determine various characteristics regarding the energy storage device 180. For example, the energy module 157 may determine a percent charged/discharged (e.g., a state of charge (SOC), etc.) of the energy storage device 180 (e.g., via a coulomb counting process, etc.) responsive to the energy data 181. In one embodiment, the energy module 157 may monitor the SOC of the energy storage device 180 to determine whether the stored energy is greater than an energy threshold. The energy threshold refers to an amount of energy stored in the energy storage device 180 that is sufficient to power at least one vehicle accessory 120 at a predefined power level for a predefined amount of time (e.g., a user may define the energy threshold in regard to a particular accessory operating at full speed for twenty seconds). Therefore, in one embodiment, the energy threshold may differ for each accessory. In other embodiments, the energy threshold may represent the minimum amount of energy needed to power all of the or a select subset of accessories for a predefined amount of time at a predefined operation level. Therefore, in one embodiment, the operation of the vehicle accessories 120 with the energy storage device 180 may be responsive to the comparison of the SOC with the energy threshold.

The energy module 157 may also be structured to determine a length of time till the stored energy reaches a certain SOC or percent of capacity discharged (e.g., fully charged, fully depleted, twenty percent of total capacity, the energy threshold, etc.) and an expected life of the battery (e.g., number of charge/discharge cycles until the battery degrades irreversibly and cannot hold a useful charge, etc.). The energy module 157 may use an algorithm, model, process, look-up table, and the like to determine the aforementioned characteristics.

The prioritization module 158 is structured to determine a priority of the vehicle accessories 120 based on priority data 182. The priority data 182 defines an order of which the vehicle accessories 120 are to be powered over other accessories. The prioritization module 158 is structured to receive the priority data 182 and prioritize each vehicle accessory 120 based on the priority data 182 and responsive to the energy data 181 and the engine data 113. As such, the prioritization module 158 determines which of the vehicle accessories 120 (one or more) receive connection to the interface unit 130 given the current demands of the system responsive to the priority data 182. The priority data 182 may be based on the engine data 113, the energy data 181, and/or various environmental data 183 (e.g., weather conditions, changes in road grades, etc.). The environment data 183 provides an indication of one or more environment conditions existing external to the system. Accordingly, the environmental data 183 may provide an indication of which of the vehicle accessories may require priority. For example, in sub-zero or desert climates, the HVAC compressor may receive priority to provide a suitable internal temperature to the vehicle 100. By way of another example, in fairly warm climates, a radiator or coolant system may receive priority to regulate the temperature of the engine 112 to prevent overheating. The prioritization provides a schedule of how energy consumption of the vehicle accessories 120 is managed by the controller 150 based on the prioritization data 182. Some vehicular accessories may be prioritized over others based on the current demands of the vehicle 100. The priority may be defined (e.g., preprogrammed, etc.) within the controller 150. As such, the prioritization process may correspond with a pre-programming step received in the controller 150. Therefore, in one embodiment, once the controller 150 is inserted in the vehicle 100, the controller 150 is ready to perform the functions described herein. In this case, only certain users/operators (e.g., service personnel, etc.) may be permitted to adjust the prioritization settings. In an alternate embodiment, the prioritization of the vehicle accessories 120 may be adjustable by vehicle operators or other users via the operator I/O device 160 to provide them with additional control over the vehicle 100 and the vehicle accessories 120.

For example, in order to prevent the engine 112 from overheating, the water pump is operated to cool the engine 112. The operation of this accessory may be essential to the performance and life of the engine. On the other hand, the HVAC compressor used to run the air conditioning within the vehicle 100 may not require such a high priority as it is secondary to the engine water pump and the health and performance of the vehicle 100. However, in regards to environmental conditions, the environmental data 183 may indicate that the external temperature (temperature outside of the vehicle 100) is below a low threshold temperature (e.g., sub-zero, below freezing, etc.), for example. The HVAC compressor may receive a higher priority in order to run the heating system to keep the operator of the vehicle 100 in at a suitable temperature. In these two cases, the power steering pump will likely never need to run at any higher speed than engine idle, but based on vehicle speed and other conditions, the power steering pump could run slower, as low as 200 RPM and provide sufficient power to turn the wheels of the vehicle.

In one embodiment, the prioritization data 182 may include a spectrum position from discretionary to critical vehicle accessories. Accordingly, the vehicle accessories 120 may fall within a spectrum (i.e., relatively more critical versus relatively more discretionary). This configuration may be used to further customize and manage mechanically-powered vehicle accessories. For example, an engine coolant pump and a power steering pump may both be classified generally as critical accessories, however, due to various encountered driving conditions (e.g., engine idle, etc.), the engine coolant pump is classified as relatively more critical, and therefore has a higher priority. In this case, prioritization may be itemized based on the accessory itself relative to the other mechanically-powered accessories. In other embodiments, the prioritization data 182 includes a binary classification of either critical or discretionary. In alternate embodiments, the prioritization data 182 may be adjusted via an operator interface, such as operator I/O device 160. Based on the environmental conditions (i.e., environment data 183, etc.), vehicle information, engine information (e.g., engine data 113, etc.), and accessory motor information (i.e., energy data 181, etc.), the vehicle accessories 120 with the highest priority may be connected to the interface unit 130.

The prioritization module 158 is also structured to receive the engine data 113 and the energy data 181 stored in the engine module 156 and the energy module 157. With the foregoing data, the prioritization module 158 may determine which of the engine 112 and the accessory motor 170 should couple to the interface unit 130 in order to power the vehicle accessories 120. In still a further embodiment, the controller 150 selectively couples particular vehicle accessories to the interface unit 130 responsive to the priority data 182. For example, if the energy data 181 indicates that the energy storage device 180 is critically depleted (i.e., the stored energy/SOC is below or approaching the energy threshold), the accessory motor 170 may not be able to power the accessories due to an insufficient supply of energy. Therefore, the controller 150 may determine that the engine 112 should be selectively coupled to the interface unit 130. In another example, the engine data 113 may indicate that the engine 112 is operating at a speed above the engine speed threshold in which the vehicle accessories 120 may not be designed to operate at (i.e., the belt or gear that drives the accessory would operate at such a speed where the integrity of the accessory may be comprised). Therefore, the controller 150 may determine that the accessory motor 170 should be selectively coupled to the interface unit 130. In still another example, the engine speed threshold may be set at 2500 RPM. If the engine speed is less than this threshold (e.g., 0 RPM, 1000 RPM, 2400 RPM, etc.) and stored energy is above the energy threshold, the controller 150 may determine that the engine 112, the accessory motor 170, or both should be selectively coupled to the interface unit 130. The method of coupling the engine 112 and/or the accessory motor 170 to operate the vehicle accessories 120 is described more fully herein.

According to the present disclosure, the interface unit module 155 is structured to selectively control the coupling of the interface unit 130 to either one or both of the engine 112 and the accessory motor 170. In this regard, the controller 150 selectively controls the facilitation of power generated by either the accessory motor 170 and the engine 112 to at least one vehicle accessory 120 via the interface unit 130. According to one embodiment, the interface unit module 155 is also structured to control how much of the power generated by either one or both of the engine 112 and the accessory motor 170 is provided to a particular vehicle accessory 120. As such, the interface unit module 155 is structured to receive the engine data 113, the energy data 181, the priority data 182, and the determinations made by the prioritization module 158. Based on whether (i) the engine speed is above the engine speed threshold and the SOC is below the energy threshold, (ii) the engine speed is above the engine speed threshold and the SOC is above the energy threshold, (iii) the engine speed is below the engine speed threshold and the SOC is above the energy threshold, (iv) the engine 112 is OFF and the SOC is above the energy threshold, (v) the engine 112 is OFF and the SOC is below the energy threshold, or any other combination thereof, the controller 150 is structured to control which of at least one of the engine 112, the vehicle accessories 120, and the accessory motor 170 are coupled to the interface unit 130. Accordingly, the controller 150 affects the appropriate connections (i.e., modes of operations) between the interface unit 130, the vehicle accessories 120, the engine 112, and the accessory motor 170 (e.g., responsive to the energy supply, engine speed, determinations made by the prioritization module 158, etc.). With the appropriate connections, an efficient operation of the vehicle as well as accessory performance is substantially achieved. For example, the vehicle accessories 120 may substantially always operated at speeds in their design range, which allows for more efficient performance than conventional systems as well as reduces wear and tear on those accessories.

Many accessories like Power Steering Pumps, Water Pumps, HVAC are all optimized to provide there rated output at engine idle, which may leave these devices to be overpowered at speeds greater than idle. For example, the power it takes to turn the wheels is exponentially larger at idle engine speed and zero vehicle speed versus idle engine speed and some marginal vehicle speed (e.g., 2 mph) just due to the added friction between the tire and road surface of a vehicle not moving. So, the power steering pump is rated to have the capability to turn the wheels at idle engine speed and zero vehicle speed. But, once the vehicle is moving and/or engine speed is greater than idle, the power steering pump is producing more power than necessary to turn the wheels of the vehicle, leaving the system to "bypass" the pressurized fluid back into the fluid storage system and essentially wasting most of the work the pump is doing. Likewise, the engine's water pump is rated to produce sufficient flow and pressure to keep the engine from overheating at engine idle and zero vehicle speed.

In another example, the water pump may be sized to provide sufficient cooling substantially across the entirety of vehicle speed and load operation. However, the water pump can also be optimized to operate based on other environmental conditions. For instance, if it's hot outside and the vehicle is in traffic moving very little, the pump can be spun faster than the current engine speed on the accessory drive system, and the opposite extreme is if it is cold outside and/or the vehicle is moving faster, then the water pump can be ran slower than the current engine speed. In this regard, the systems and methods described herein contemplate optimization between accessories. In regard to the water pump example, there can also be optimization between the water pump running and engine fan operation. On larger vehicles a mechanical fan can consume upwards of 30-50 HP, if cooling is optimized by running the water pump faster or slower and keeping the fans off longer, then there is an overall benefit to vehicle efficiency.

In still another example, air compressors are primarily used for air brakes, but depending on the vehicle application, other air systems may be onboard, relying on the air compressor of the vehicle to recharge the air storage. Again, the compressors are sized to provide sufficient air supply to the air system at engine idle. But, there are only a certain number of available compressors, so typically the compressor is larger than required. At engine speed greater than idle, the air system will recharge faster, but the compressor maybe running at an inefficient operating point. Some air compressors are piston compressors, which have a peak efficiency speed, operating slower or faster will result in extra heat and wasted work from the compressor.

As illustrated above, the interface module interface unit module 155 is structured to selectively pick the best points and best speeds to operate each accessory responsive to the priority data 182, energy data 181, engine data 113, and environment data 183. Thus, while some structure of the controller 150 is described below as the ability to facilitate power transfer based on reaching a certain threshold, it is important to note that the controller 150 can also facilitate turning an accessory ON or OFF not only when a threshold is reached, but when operating conditions favor the efficient use of the accessory. For instance, the air system may be in a normal operating range, below max pressure and below the min pressure. However, the engine is operating at 1200 rpm and that is peak efficiency speed for the air compressor. In one embodiment, the interface unit module 155 can facilitate charging the air system if the engine speed is steady and appears to operating within this peak efficiency range. The interface unit module 155 can shut the air compressor off once it leaves the peak efficiency area (assuming it is still above the low turn on threshold). This may be the case for any accessory that has a storage mechanism attached to it like air tanks, or even the battery storage system. However, other strategies and processes described herein may be applicable with on-demand accessories, such as water pumps or steering pumps.

In one instance of operation, the stored energy in the energy storage device 180 is less than or equal to the energy threshold (e.g., within 5% of the threshold value qualifies as "equal to", etc.). Therefore, the controller 150 provides an actuation mechanism to couple the engine 112, not the accessory motor 170, with the interface unit 130. Upon coupling, the interface unit 130 transmits power supplied from the engine 112 to one or more vehicle accessories 120. The one or more vehicle accessories 120 that receive the power are based on the prioritization, as described above. Thereby, the engine 112 may operate the vehicle accessories 120 (i.e., the first mode of operation) whether the engine speed exceeds the engine speed threshold or not. By way of example, the controller 150 may also provide an actuation mechanism to couple the accessory motor 170 to the interface unit 130 such that the accessory motor 170 acts as a generator to store excess energy from the engine 112 in the energy storage device 180.

Alternatively, when the energy threshold is not met, the controller 150 may use a state of the engine 112 (e.g., ON or OFF) to control whether the engine 112 is selectively coupled to the interface unit 130. For example, if the engine speed is less than the engine speed threshold, the classification of whether the engine is OFF (i.e., 0 RPM) or ON (i.e., greater than 0 RPM, but less than 2500 RPM), is not explicit. Thus, by explicitly determining the state of the engine 112, the mode of operation may be determined and implemented by interface unit module 155. By way of example, when the engine 112 is ON (i.e., greater than 0 RPM, but less than 2500 RPM) and the energy threshold is not met, the first mode of operation is implemented by the interface unit module 155, as mentioned above. However, when the engine 112 is OFF and the energy threshold is not met, neither the engine 112 nor the accessory motor 170 is coupled to the interface unit 130, such that the vehicle accessories 120 are not driven.

Another instance of operation may be when the engine speed is below the engine speed threshold (while the engine 112 is ON) and the stored energy is above the energy threshold. In this case, to facilitate power transmission, the controller 150 provides an actuation mechanism to couple the engine 112 and the accessory motor 170 with the interface unit 130. Upon coupling, the interface unit 130 transmits power supplied from the engine 112 and the accessory motor 170 to one or more vehicle accessories 120 (i.e., a combination of the first and second modes of operation). This system configuration provides for a blending of accessory motor 170 and engine 112 power that is used to power one or more vehicle accessories 120.

In still another instance of operation, the energy stored in energy storage device 180 may be above the energy threshold and the engine 112 is either OFF or the engine speed is above the engine speed threshold. In this case, to facilitate power transmission, the controller 150 provides an actuation mechanism to only couple the accessory motor 170 with the interface unit 130. Upon coupling, the interface unit 130 transmits power supplied from the accessory motor 170 to one or more vehicle accessories 120 (i.e., the second mode of operation).

Figure 3:
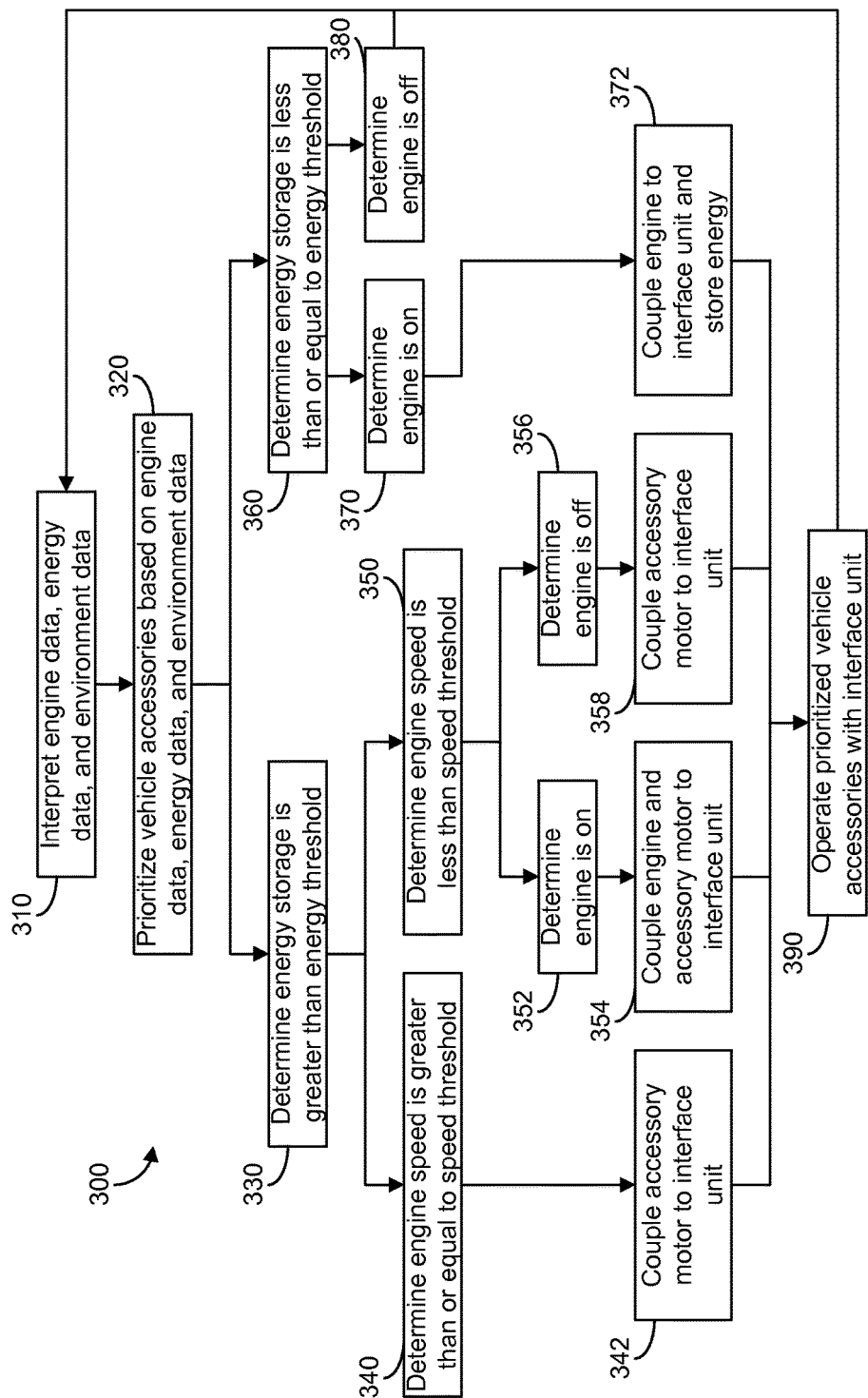
FIG. 3 is a flow diagram of a method for determining when vehicle accessories are engine driven or accessory motor driven, according to an example embodiment

Referring now to FIG. 3, a method 300 for deciding when vehicle accessories are engine driven or accessory motor driven based on the energy data 181 and the engine data 113 is shown according to an example embodiment. In one example embodiment, the method 300 may be implemented with the controller 150 of FIGS. 1-2. Accordingly, method 300 may be described in regard to FIGS. 1-2.

During, prior to, or following operation of the vehicle 100, the controller 150 interprets at least one of engine data 113 and energy data 181 (process 310) regarding the engine 112 and the energy storage device 180. As mentioned above, the engine data 113 may include an engine speed, an engine output power, an engine temperature, a state of the engine, and/or any other engine data that may be received by the controller 150 via the engine module 156. The energy data 181 may include a battery temperature, an input/output voltage, an input/output current, a battery load, a discharge rate, a frequency of use, a length of use, an intensity of use, and the like. Based on the received energy data 181, the controller 150 may determine various characteristics regarding the energy storage device 180, such as a SOC and/or a length of time till the stored energy reaches a certain SOC (e.g., the energy threshold, etc.).

At process 320, the controller 150 prioritizes the vehicle accessories (e.g., the vehicle accessories 120, etc.) based on a priority arrangement (e.g., the priority data 182, etc.) responsive to at least one of the engine data 113, the energy data 181, and the environment data 183. In one embodiment, the priority arrangement may include a spectrum position from discretionary to critical vehicle accessories. Accordingly, the vehicle accessories may fall anywhere within that spectrum (i.e., relatively more critical versus relatively more discretionary). This configuration may be used to further customize and manage mechanically-powered vehicle accessories, as described above. Based on the environment data 183, the engine data 113, and the energy data 183, the vehicle accessories with the highest priority may be connected to the interface unit 130.

At process 330, the controller 150 determines whether the stored energy of the energy storage device 180 is greater than an energy threshold. To determine the amount of stored energy, the controller interprets the state of charge (SOC) of the energy storage device 180 which may indicate an amount of stored energy (e.g., a percentage of a maximum capacity, an energy rating, amount of power, an estimated duration of use, etc.). At process 360, controller 150 determines whether the state of charge of the energy storage device 180 is less than or equal to the energy threshold. In one embodiment, process 330 and process 360 are performed simultaneously to determine whether the energy storage is greater than, less than, or equal to the energy threshold. In another embodiment, only one of process 330 and process 360 is preformed based on if the first process performed satisfies the energy threshold requirement. For example, if process 330 is performed first and the stored energy is greater than the energy threshold, process 360 is not performed. In other embodiments, process 330 and process 360 are performed serially (e.g., process 330 then process 360 or vice versa, etc.) if the first process does not satisfy the requirements.

The energy data is indicative of energy characteristics (e.g., the energy capacity characteristics, etc.) of the energy storage device 180 determined from the energy data 181 may be stored in the energy module 157. The controller 150 may access the energy module 157 and determine whether the stored energy is above or below the energy threshold. The energy threshold may be set as a percentage of the total capacity of the energy storage device 180, a length of time left in the operation of the accessory motor 170 at a certain output rate, or any other threshold which defines whether or not the energy storage device 180 has a sufficient amount of stored energy to operate the accessory motor 170. In one embodiment, the controller 150 may decouple accessories from the accessory motor and couple them to the engine 112 as the SOC of the energy storage device 180 approaches the energy threshold (see, e.g., FIG. 6, etc.). For example, if the SOC is within 20% of the energy threshold, the engine 112 may supply 80% of the power. If within the SOC is within 10% of the energy threshold, the engine 112 may supply 90% of the power.

If the stored energy in the energy storage device 180 is determined to be greater than the energy threshold (process 330), at process 340, the controller 150 determines the engine speed is either greater than or equal to an engine speed threshold. Alternatively, at process 350, the controller 150 determines the engine speed is less than the engine speed threshold. Process 340 and process 350 may be performed simultaneously, serially, or exclusively. As mentioned above, the engine characteristics (e.g., engine speed, etc.) may be measured by one or more sensors 140 and stored in the engine module 156, which may be accessed by the controller 150 to make certain decisions.

If the engine speed is determined to be less than the engine speed threshold (process 350), the controller 150 determines the state of the engine (e.g., ON, OFF, etc.). At process 352, the controller 150 determines the engine is ON (e.g., engine speed greater than 0 RPM, etc.). If the engine is ON, at process 354, the controller 150 couples the engine 112 and the accessory motor 170 to the interface unit 130 (i.e., the first mode and the second mode of operation). Alternatively, at process 356, the controller 150 determines the engine is OFF (e.g., engine speed is 0 RPM, etc.). If the engine is OFF, at process 358, the controller 150 couples the accessory motor 170 to the interface unit 130 (i.e., the second mode of operation).

Referring back to process 340, if the engine speed is greater than or equal to the engine speed threshold, at process 342 the controller 150 may couple only the accessory motor 170 to the interface unit 130 (e.g., the second mode). To simplify, for process 342, the stored energy is above the energy threshold and the engine speed is above the speed threshold.

Referring back to process 360, if the stored energy in the energy storage device 180 is determined to be less than or equal to the energy threshold, the controller 150 determines the state of the engine (e.g., ON, OFF, etc.). At process 370, the controller 150 determines the engine is ON (e.g., engine speed greater than 0 RPM, fuel being injected into a cylinder, etc.). If the engine is ON, at process 372, the controller 150 couples the engine 112 and the accessory motor 170 to the interface unit 130 to drive the accessory motor 170 to store energy in the energy storage device 180 for a future use (i.e., the first mode of operation). The engine 112 also provides the power to operate the vehicle accessories 120. Alternatively, at process 380, the controller 150 determines whether the engine is OFF (e.g., engine speed is 0 RPM, no fuel commanded to be injected into a cylinder of the engine, etc.). If the engine is OFF, the controller 150 receives at least one of engine data 113 and energy data 181 (process 310) regarding the engine 112 and the energy storage device 180, and repeats method 300. For example, if the engine 112 is OFF and the energy storage device 180 is substantially depleted (e.g., below the energy threshold, etc.), the available power to run the vehicle accessories 120 is insufficient.

To clarify, process 372 covers the case where the stored energy is below the energy threshold and the engine 112 is ON. The engine speed does not influence this process since the accessory motor 170 may not contribute any power due to the lack of stored energy in the energy storage device 180. If the engine is OFF, the vehicle accessories 120 may not be driven until the state of the engine 112 to change from OFF to ON. The vehicle accessories 120 may not function unless at least one of there is enough stored energy to operate the accessory motor 170 and the engine 112 is ON, both of which may then provide the power to the interface unit 130 to run the vehicle accessories 120. At process 390, preceded by any of the processes 342, 354, 358, and 372, the engine 112, the accessory motor 170, or both provide the power necessary to the interface unit 130 based on the mode of operation (e.g., the first mode, the second mode, etc.) to operate the vehicle accessories 120 given priority, as mentioned above. The modes of operation referenced throughout the method 300 are described more fully herein.

An example implementation of method 300 with an engine speed less than the engine speed threshold (e.g., 1500 RPM, etc.) and a SOC greater than the energy threshold (e.g., 100% SOC, etc.) is as follows. The controller 150 receives and interprets the engine data 113 and the energy data 181 (process 310). The controller 150 prioritizes the vehicle accessories 120 responsive to the foregoing data (process 320). For example, if the engine is substantially hot, a coolant pump may be coupled to the interface unit 130. The controller determines that the energy storage in the energy storage device is above the energy threshold (process 330). The controller 150 determines the engine speed is less than the engine speed threshold (process 350). The controller 150 determines the engine 112 is ON (process 352). The controller 150 selectively couples the engine 112 and the accessory motor 170 to the interface unit 130 (process 354). The controller 150 operates the prioritized vehicle accessories 120 through the interface unit 130 (process 390). To continue the example, the coolant pump is operated such that the engine 112 and its components are cooled to substantially prevent failure conditions through heat soak and the like.

Figure 4:
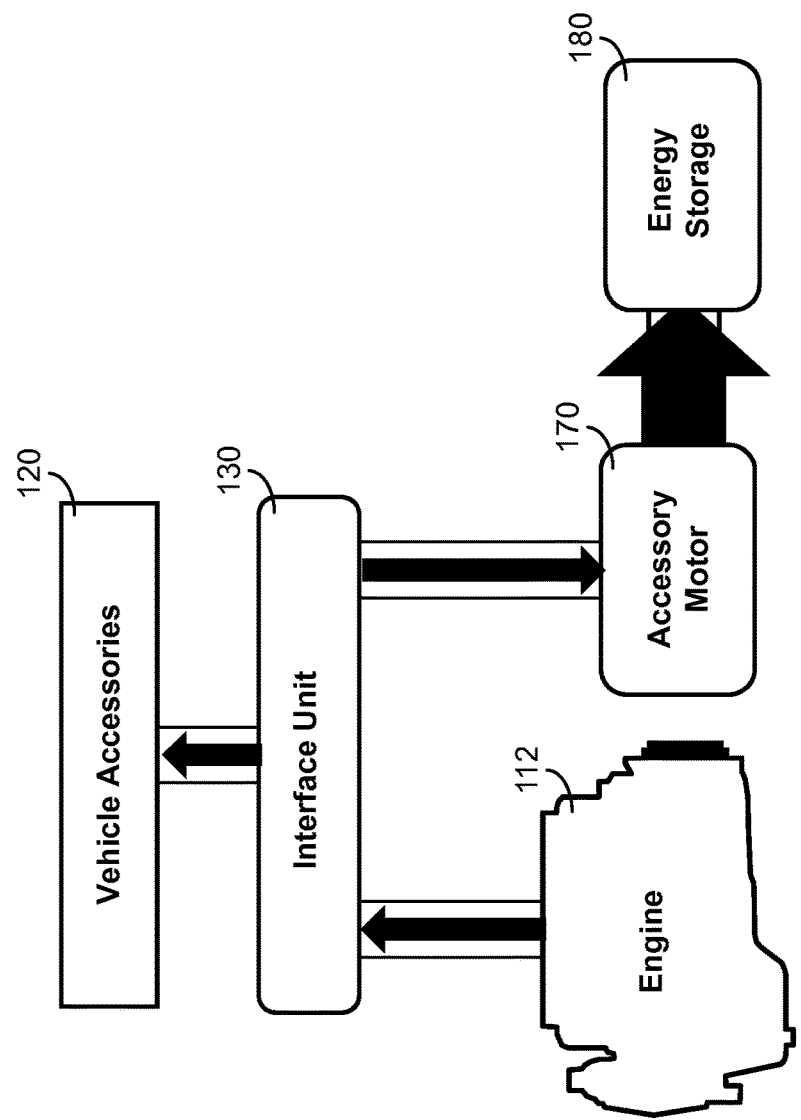
FIG. 4 is a schematic diagram of a first mode of operation of a system, according to an example embodiment.

Referring now to FIG. 4, a schematic diagram of the first mode of operation of the system is shown according to an example embodiment. As shown, the engine 112 drives the accessory motor 170 via the interface unit 130. The engine 112 also drives the vehicle accessories 120 via the interface unit. Accordingly, in the first mode of operation, the engine 112 may drive both the accessory motor 170 and the vehicle accessories 120 via the interface unit 130. The first mode of operation refers to where the accessory motor 170 acts as a generator to resupply or charge the energy storage device 180. Accordingly, as shown and described above, in the first mode the power is substantially provided by the engine 112. By way of example, the accessory motor 170 may take the place of a traditional alternator in an internal combustion engine setup. A traditional alternator is an electrical generator that converts mechanical energy to electrical energy in the form of alternating current. Therefore, the accessory motor 170 may run off the engine 112 via the interface unit 130 (i.e., mechanical energy supply), converting the mechanical energy (e.g., rotational input energy) to electrical energy, as mentioned above. The electrical energy is then transferred to the energy storage device 180 which converts the electrical energy to chemical energy to be stored for future use.

Referring still to FIG. 4, while the engine 112 supplies the mechanical energy to the accessory motor 170 via the interface unit 130, the engine 112 also drives the vehicle accessories 120 via the interface unit 130 as shown. In one embodiment, the first mode of operation is implemented by the controller 150 when the stored energy is below the energy threshold, independent of the engine speed. However, the engine speed may be a deciding factor in the other modes of operation.

Figure 5:
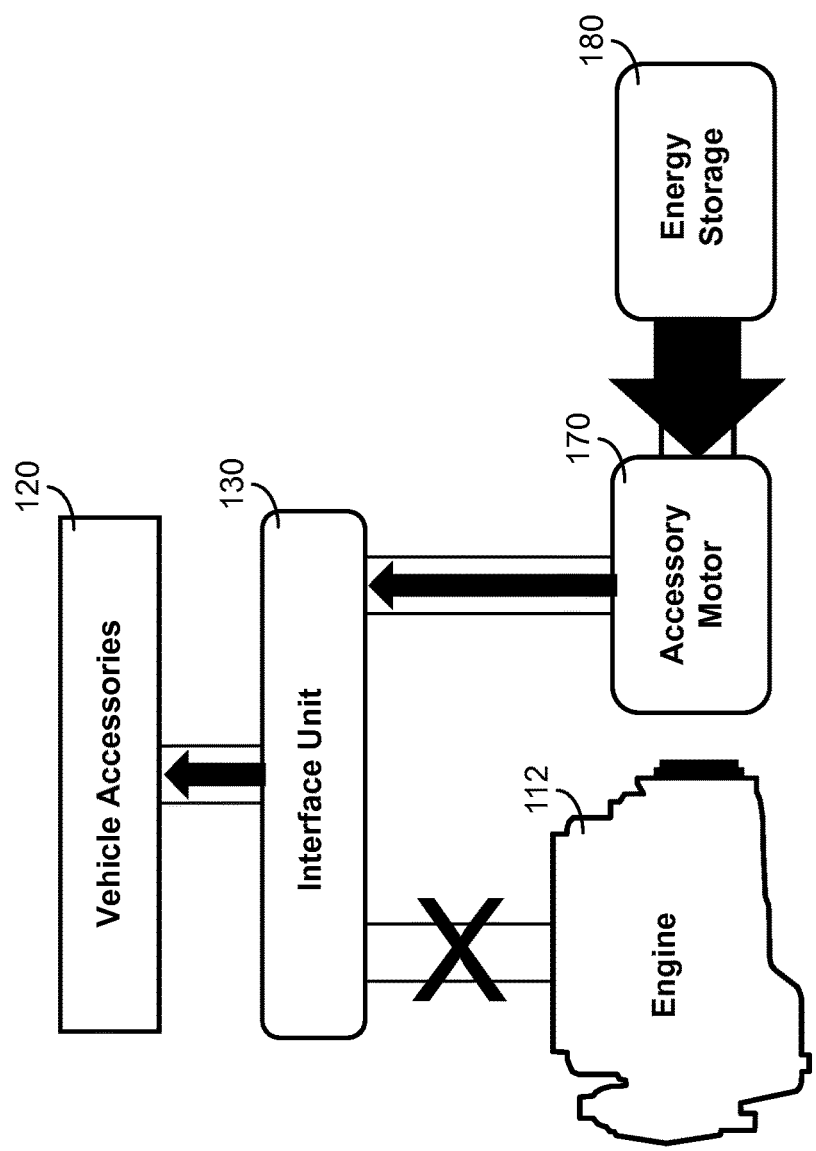
FIG. 5 is a schematic diagram of a second mode of operation of a system, according to an example embodiment.

Referring to FIG. 5, a schematic diagram of the second mode of operation of the system is shown according to an example embodiment. The second mode of operation refers to the controller 150 facilitating the accessory motor 170 to provide all of the torque to operate the vehicle accessories 120. In the second mode, the energy storage device 180 converts the stored energy (e.g., electrochemical energy), accumulated during the first mode of operation, to electrical energy for the consumption of the accessory motor 170. With a reserve of stored energy above a stored energy threshold (e.g., SOC is more than 60% of the maximum charge capacity, etc.), the controller 150 commands the accessory motor 170 to operate by converting the electrical energy input to mechanical energy in the form of a rotating output shaft connected to the interface unit 130 to drive the vehicle accessories 120. As shown in FIG. 5, when the second mode of operation is selected, the controller 150 decouples the engine 112 from the interface unit 130, such that the engine 112 is substantially prevented from contributing power to the interface unit 130 and, consequently, to the vehicle accessories 120. In one embodiment, the engine may be OFF. As such, the controller 150 instructs the accessory motor 170 to supply the required mechanical energy to power the vehicle accessories 120. For example, if the engine is currently OFF but had been running for a predetermined amount of time (e.g., a few hours, etc.), the temperature of the engine 112 and the surrounding components may be at an elevated temperature (e.g., above the ambient temperature, etc.). Operating the water pump may remove the heat from the engine 112 in a relatively quicker fashion than allowing the components to equilibrate with the ambient environment. This may be achieved by turning on the accessory motor 170, which provides the power to operate the pump via the interface unit 130.

In another embodiment, the engine may be operating at a substantially high engine speed (e.g., well above engine idle operation, above an engine speed threshold, etc.). Many of the vehicle accessories 120 are sized for operation at lower engine speeds such as during moments of engine idle and when the engine is OFF. In one embodiment, with the gearing in the interface unit 130, the engine speed may be reduced to an appropriate accessory operating speed. In this regard, the interface unit may include multiple gear trains for each one of the mechanically-driven vehicle accessories. At substantial engine speeds (e.g., at or above the engine speed threshold), due to the sizing, the vehicle accessories 120 may operate inefficiently. Therefore, at higher engine speeds, the accessory motor 170 may drive the accessories. The second mode of operation may be activated by the controller 150 when and while the stored energy reserves in the energy storage device 180 are substantial (e.g., above the energy threshold, etc.). Therefore, in the case where the energy storage device 180 is critically low (e.g., below the energy threshold, etc.), the vehicle accessories 120 may be driven with the engine 112 (i.e., the first mode) at high engine speeds until the level of stored energy is sufficient to operate the accessory motor 170.

Figure 6:
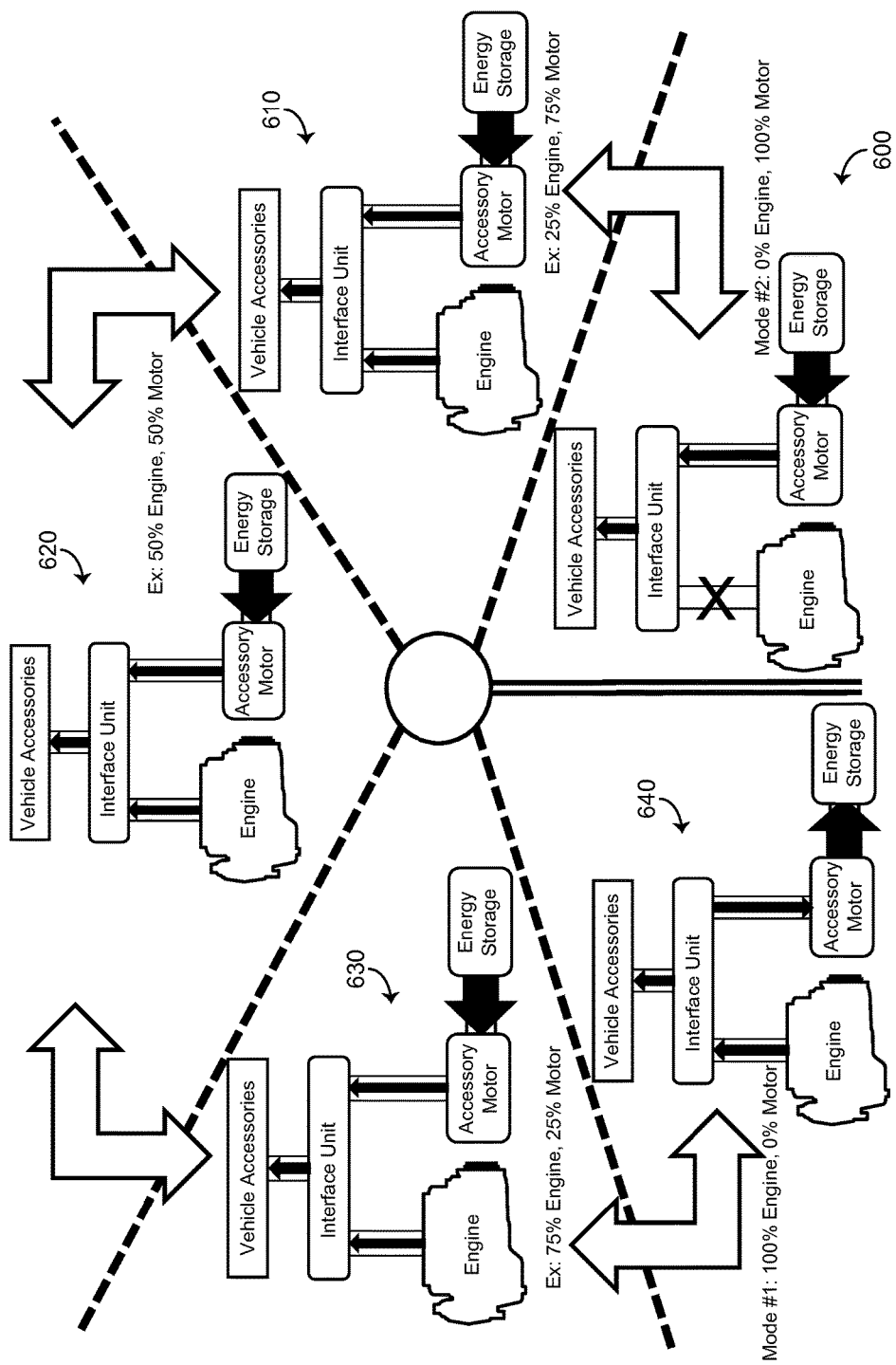
FIG. 6 is a schematic diagram of controlling accessory power between the first and second modes of operation, according to an example embodiment.

Referring now to FIG. 6, a schematic diagram of controlling accessory power between the first mode and the second mode is shown according to an example embodiment. As shown in FIG. 6, the engine 112 and the accessory motor 170 may operate in-between the first mode and the second mode (i.e., a blended power arrangement). For example, if the system begins operation with the energy storage device 180 at full capacity (e.g., at or near 100% SOC), the controller 150 may implement the second mode of operation (i.e., 100% motor and 0% engine) (embodiment 600). In one embodiment, the engine 112 is OFF. In another embodiment, the accessory motor 170 provides the starting torque required to start the engine 112 (see the third mode of operation in FIG. 7). As the level of stored energy begins to deplete (e.g., 80% of maximum energy capacity, etc.), the controller 150 may selectively couple the engine 112 to the interface unit 130 such that the engine 112 may begin to contribute to the energy supplied to the interface unit 130 (e.g., 75% motor and 25% engine, etc.), as shown in the transition from embodiment 600 to embodiment 610. The controller 150 may continue to transition the supply of power from the engine 112 and the accessory motor 170 (e.g., as the stored energy continues to deplete, approaches the energy threshold, etc.), gradually increasing the power supplied by the engine 112 and decreasing the power supplied by the accessory motor 170. The controller 150 may continue this transition until the energy threshold is reached, such that the first mode of operation (i.e., 0% motor and 100% engine) may be implemented (embodiment 640) as shown in FIG. 6. As described above, the accessory motor 170 may remain coupled to the interface unit 130 and act as a generator to store energy in the energy storage device 180.

As shown in FIG. 6, the controller 150 selectively controls the blending of the power provided by the engine 112 and the accessory motor 170 to the interface unit 130 based on the engine data 113 and/or the energy data 181. In embodiment 600, corresponding to the second mode of operation, the accessory motor 170 provides the power to the interface unit 130 to drive the vehicle accessories 120. As energy depletes from the energy storage device 180, additional power may be needed from the engine 112. The controller 150 transitions operation of the system to embodiment 610. To transition from embodiment 600 to embodiment 610, the controller 150 may implement the third mode of operation such that the accessory motor 170 provides a starting torque to start the engine 112, according to one embodiment. In other embodiments, the engine 112 includes a starting mechanism other than the accessory motor 170 to start the engine 112. As the energy in the energy storage device 180 continues to deplete during operation, the controller 150 transitions from embodiment 610 to embodiment 620, increasing the power from the engine 112 and reducing the power from the accessory motor 170. This process continues to embodiment 630 as the energy is further depleted, further increasing the ratio of engine power to accessory motor power. Embodiment 640 is implemented, corresponding to the first mode of operation, when the SOC of the energy storage device 180 approaches the energy threshold. As shown in FIG. 6, the transition of power across the embodiments 600-640 follows a pattern of 25% increments. The relative power transmissions are meant for exemplary purposes only. In other embodiments, the relative powers may not follow a pattern of 25% increments. The pattern may be a continuous transfer of power, or include increments greater than or less than 25% (e.g., 5%, 8%, 9.5%, 10%, 30%). In some embodiments, the transition of power may transfer completely from 100% of power provided by the accessory motor 170 to 100% of power provided by engine 112 with no intermediate transition of power. All such variations are intended to fall within the spirit and scope of the present disclosure.

According to an example embodiment, the controller 150 facilitate power transmission to the interface unit 130 from the accessory motor 170 based on a charge threshold and a discharge threshold responsive to the SOC of the energy storage device 180. The charge and discharge thresholds may be defined by a user via I/O device 160, be fixed from manufacturing personnel, or adjustable by user depending on the application and desires of the user. The discharge threshold refers to a depletion level of stored energy in the energy storage device 180 that triggers or signals that additional charge is needed. The discharge threshold may refer to an acceptable depletion amount. The acceptable depletion amount may be based on charge time (e.g., a depletion level that permits full charging (or to certain threshold) within a define allotment of time), half-life of the battery due to repeated charges, and the like. As an example, the discharge threshold may be a SOC near full depletion of the stored energy in the energy storage device 180 (e.g., 10% SOC, 20% SOC, etc.). In comparison, the charge threshold refers to a desired charge level for the energy storage device 180. In one embodiment, the charge threshold may be equal or substantially equal to the energy threshold. In another embodiment, the charge threshold may be any charge threshold at or above the discharge threshold, such that the charge threshold may not necessarily correspond with the energy threshold. Thus, the controller 150 may utilize the charge/discharge thresholds to control charging of the energy storage device 180 independent of the energy requirements to power one or more vehicle accessories as defined by the energy threshold.

Accordingly, as briefly mentioned above, in one embodiment, the controller 150 begins to charge the energy storage device 180 when the amount of stored energy depletes to at or below the discharge threshold. The controller 150 then facilitates power transmission from the engine 112 to the interface unit 130 to the accessory motor 170 to the energy storage device 180 to charge the energy storage device 180 until the amount of stored energy reaches at or above the charge threshold. In one embodiment, the energy storage device 180 is charged until full capacity is reached (i.e., fully charged, etc.). In this configuration, the charge threshold represents the full charge amount. In another embodiment, the charge threshold may represent the energy threshold. In this situation, the controller 150 facilitates power transmission until the charge level is at or above the energy threshold.

In some embodiments, the controller 150 may cease charging the energy storage device 180 before the charge threshold is met if the system requires power input from the accessory motor 170 to operate the vehicle accessories 120 (e.g., the engine speed is above the speed threshold, the engine is in an OFF state, blended power provided by the engine 112 and the accessory motor 170 based on a substantial power demand from vehicle accessories 120, etc.). In another embodiment, the controller 150 continues to facilitate power transmission to the vehicle accessories 120 with power from the accessory motor 170 when the amount of energy in the energy storage device 180 is below the discharge threshold. For example, the engine 112 may be in an OFF state and the priority data 182 may indicate that it is critical to run certain vehicle accessories 120 (e.g., a water pump to cool the engine 112 after operation, etc.). Therefore, the accessory motor 170 may provide power to the interface unit 120 until the vehicle accessories 120 no longer need to be run or the energy storage device 180 is fully depleted (i.e., no stored energy, a 0% SOC, etc.).

Figure 7:
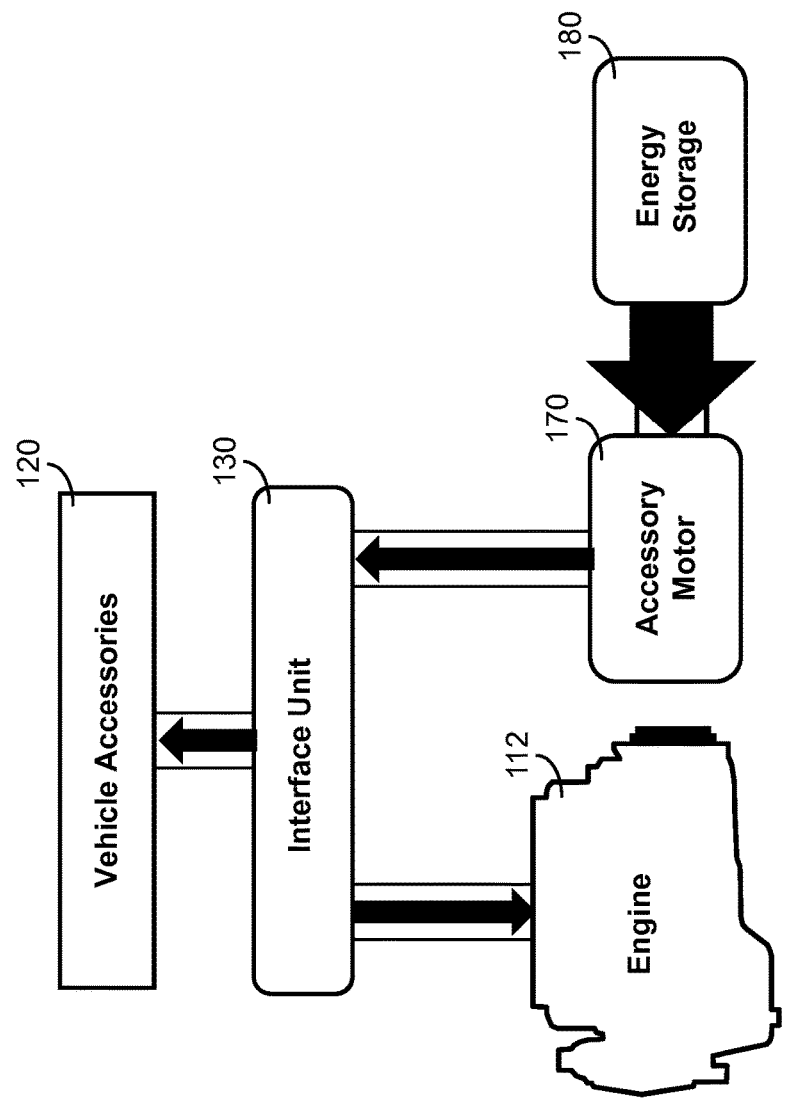
FIG. 7 is a schematic diagram of a third mode of operation of a system, according to an example embodiment.

Referring now to FIG. 7, a schematic diagram of the third mode of operation is shown according to an example embodiment. In one embodiment, the system may be operating in the second mode where the accessory motor 170 is supplying all or substantially all of the power to operate the vehicle accessories 120, as mentioned above. However, in this particular embodiment, the engine is off as well. At some point while in the second mode of operation, an engine start request is made. At this point, the controller 150 may transition the system from the second mode to the third mode of operation. In the third mode of operation, the accessory motor 170 continues to supply the power to drive the vehicle accessories 120, but it may also provide the power to engage a starting mechanism in order to start the engine 112. As such, the third mode of operation is a momentary engagement between the accessory motor 170 and the engine 112 for starting purposes only, and then the second mode of operation is reinstated.

Referring now to FIGS. 8-11, an accessory control strategy based on power steering is shown according to an example embodiment. While FIGS. 8-11 show an optimization strategy for a power steering for the vehicle 100, it should be noted that similar control strategies may be used for other vehicle accessories 120. Therefore, the examples shown in FIGS. 8-11 are not meant to be limiting.

Figure 8:
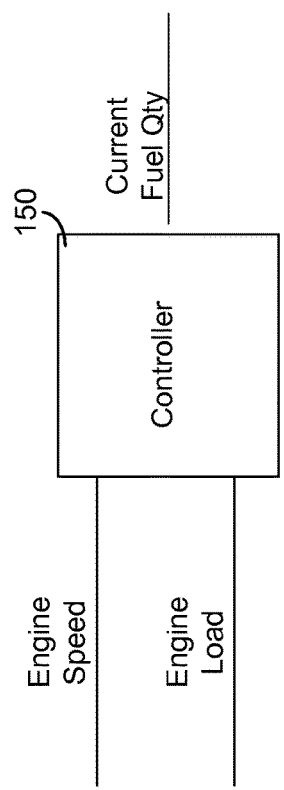
FIG. 8 is a schematic diagram of determining an amount of fuel consumed by an engine, according to an example embodiment.
Figure 9:
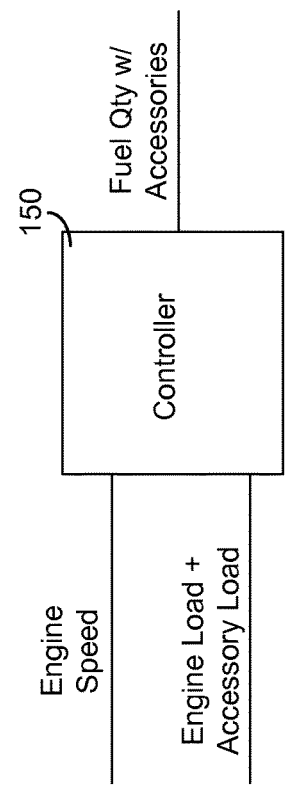
FIG. 9 is a schematic diagram of determining an amount of fuel consumed by the engine, according to another example embodiment.

As shown in FIG. 8, the controller 150 is structured to determine the amount of fuel the vehicle 100 is consuming to power the engine 112. The controller 150 interprets engine speed data and engine load data (e.g., engine data 113, etc.) to determine the amount of fuel being consumed. As shown in FIG. 9, the controller 150 is structured to determine the amount of fuel the vehicle 100 is consuming to power the engine 112 and the vehicle accessories 120. The controller 150 interprets engine speed data, engine load data, and accessory load data to determine the amount of fuel being consumed. Based on the fuel consumed to power the engine 112 and the fuel consumed to power both the engine 112 and the vehicle accessories 120, the controller 150 may determine a fuel factor, FF, as shown by the following expression:

$$FF = \frac{M_{Fuel_{Acc}}}{M_{Fuel_{Eng}}} \qquad (1)$$

where $M_{Fuel_{Acc}}$ is the amount of fuel consumed to power the engine 112 and the vehicle accessories 120, and $M_{Fuel_{Eng}}$ is the amount of fuel consumed to power the engine 112 alone.

Figure 10:
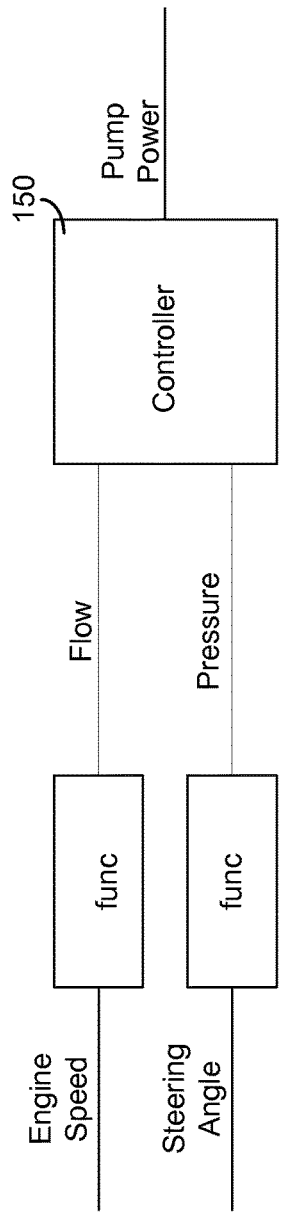
FIG. 10 is a schematic diagram of determining a performance characteristic of an accessory when the accessory is engine driven, according to an example embodiment.

As shown in FIG. 10, the controller 150 determines a power index based on being driven by the engine 112. The power index may include a number, a rating (e.g., relative to other accessories, etc.), etc. for a vehicle accessory 120 (e.g., a power steering pump, etc.) based on being driven by the engine 112. The power index refers to the power (shown as pump power) required to operate an individual vehicle accessory 120 with either the engine 112 or the accessory motor 170. In one embodiment, the controller 150 interprets fluid flow (e.g., hydraulic fluid, etc.) into the power steering pump which is a function of the engine speed of the engine 112. The controller 150 further interprets the fluid pressure (e.g., hydraulic pressure, etc.) of the fluid flow into the power steering pump which is a function of the steering angle of a steering mechanism. The power of the power steering pump may be determined based on the fluid flow and fluid pressure, thereby facilitating the determination of the power index when engine driven, shown as a number in equation (2):

$$PN_{Eng} = \frac{P}{\eta_{mech}} \cdot FF \qquad (2)$$

where $PN_{Eng}$ is the performance number of the vehicle accessories 120 (e.g., the power steering pump, etc.) when engine driven, P is the power of the vehicle accessories 120, in this case the power of the power steering pump, and $\eta_{mech}$ is the efficiency of the transfer of power from engine 112 to the vehicle accessories 120.

Figure 11:
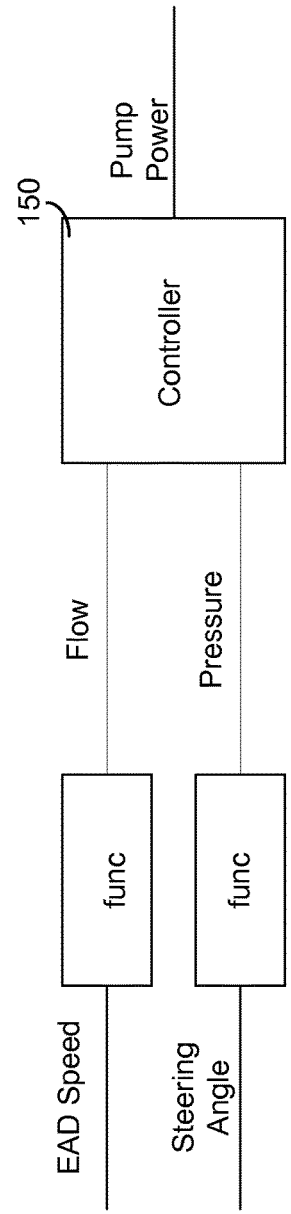
FIG. 11 is a schematic diagram of determining a performance characteristic of an accessory when the accessory is accessory motor driven, according to an example embodiment.

As shown in FIG. 11, the controller 150 determines a power index for the vehicle accessories 120 (e.g., the power steering pump, etc.) based on being driven by the accessory motor 170. The controller 150 interprets the fluid flow (e.g., hydraulic fluid, etc.) into the power steering pump which is a function of the engine speed of the engine 112. The controller 150 interprets fluid pressure (e.g., hydraulic pressure, etc.) of the fluid flow into the power steering pump which is a function of the steering angle of a steering mechanism. The power of the power steering pump may be determined based on the fluid flow and fluid pressure, thereby facilitating the determination of the power index when accessory motor driven:

$$PN_{Acc} = \frac{P}{\eta_{EAD} \cdot \eta_{Acc}} \qquad (3)$$

where $PN_{ACC}$ is the power index of the vehicle accessories 120 (e.g., the power steering pump, etc.) when accessory motor driven, $\eta_{ACC}$ is the efficiency of the transfer of power from accessory motor 170 to the vehicle accessories 120, and $\eta_{EAD}$ is the efficiency of the EAD. $\eta_{EAD}$ is a function of the state of charge of the energy storage device 180.

The controller 150 implements the accessory optimization control strategy to determine whether to drive the vehicle accessories 120 with the engine 112, the accessory motor 170, or a combination of the two by comparing the results of Equations (2) and (3). Accordingly, in one embodiment, the controller 150 determines the lower of $PN_{Eng}$ and $PN_{ACC}$ and, based on this determination, selects which of at least one of the engine 112 and the accessory motor 170 to operate as a power source for the vehicle accessories 120. Accordingly, as shown in equations (2) and (3), the controller 150 bases the aforementioned determination on the current operating conditions (e.g., accessory loads, engine speed, state of charge of the energy storage device 180, the engine data 113, the energy data 181, the environment data 183, etc.). As such, the controller 150 dynamically controls the system to facilitate efficient operation of the engine 112, vehicle accessories 120, and the accessory motor 170.

In one embodiment, the controller 150 determines the accessory optimization control strategy on an individual vehicle accessory 120 basis such that the engine 112 and the accessory motor 170 may drive separate vehicle accessories 120. For example, the engine 112 may drive the power steering pump, while the accessory motor 170 drives the HVAC compressor. In other embodiments, the controller 150 determines the accessory optimization control strategy on the vehicle accessories 120 as a whole such that all the vehicle accessories 120 (which are connected to the interface unit 130) are driven by the engine 112, the accessory motor 170, or the combination of the two.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
an engine module structured to interpret engine data indicative of operation of an engine;
an energy module structured to interpret energy data indicative of an amount of energy stored in an energy storage device, wherein the energy storage device is coupled to an accessory motor and structured to selectively power the accessory motor; and
an interface unit module structured to control power transmission from at least one of the engine and the accessory motor to at least one accessory via an interface unit responsive to the engine data and the energy data, wherein the interface unit module is further structured to facilitate power transmission from only the accessory motor to the at least one accessory via the interface unit responsive to the engine data indicating a speed of the engine is at or above a speed threshold for the engine, and wherein the interface unit is situated as an intermediary between the at least one accessory and each of the engine and the accessory motor.

2. The apparatus of claim 1, wherein the interface unit module is structured to facilitate power transmission from only the engine to the at least one accessory via the interface unit responsive to the energy data indicating the amount of energy stored in the energy storage device is below an energy threshold.

3. The apparatus of claim 1, wherein the interface unit module is structured to facilitate power transmission from both the accessory motor and the engine to the at least one accessory via the interface unit responsive to the engine data indicating a speed of the engine is below a speed threshold and the energy data indicating the amount of energy is at or above an energy threshold.

4. The apparatus of claim 1, wherein the interface unit module is structured to facilitate power transmission from only the accessory motor to the at least one accessory via the interface unit responsive to the engine data indicating the engine is in an OFF state and the energy data indicating the amount of energy stored in the energy storage device is at or above an energy threshold.

5. The apparatus of claim 1, wherein the interface unit module is structured to cease power transmission from both the accessory motor and the engine to the at least one accessory via the interface unit responsive to the engine data indicating the engine is in an OFF state and the energy data indicating the amount of energy in the energy storage device is below an energy threshold.

6. The apparatus of claim 1,
wherein the interface unit module is structured to facilitate power transmission from the engine to the accessory motor via the interface unit to charge the energy storage device responsive to the energy data indicating the amount of energy in the energy storage device is at or below a discharge threshold; and
wherein the interface unit module is structured to continue power transmission from the engine to the interface unit to the accessory motor until the energy data indicates the amount of energy in the energy storage device is at or above a charge threshold.

7. The apparatus of claim 1, wherein the interface unit module is structured to facilitate power transmission from the accessory motor to the engine and to at least one accessory responsive to the engine data indicating the engine is transitioning from an OFF state to an ON state.

8. A system, comprising:
an engine;
an accessory motor coupled to an energy storage device;
an interface unit coupled to each of the engine and the accessory motor, wherein the engine is not directly coupled to the accessory motor;
at least one accessory coupled to the interface unit; and
a controller communicably coupled to the engine, the accessory motor, the energy storage device, the interface unit, and the at least one accessory, wherein the controller is structured to:
receive engine data indicative of operation of the engine;
receive energy data indicative of an amount of energy stored in the energy storage device; and
selectively control power transmission from at least one of the engine and the accessory motor to the at least one accessory via the interface unit responsive to the engine data and the energy data;
wherein the controller is further structured to facilitate power transmission from only the accessory motor to the at least one accessory via the interface unit responsive to the engine data indicating a speed of the engine is at or above a speed threshold for the engine.

9. The system of claim 8,
wherein each one of the at least one accessory is a mechanically-driven accessory; and
wherein the interface unit includes at least one of one or more gear trains and one or more belts for coupling the interface unit to each one of the mechanically-driven accessories.

10. The system of claim 9, wherein the at least one accessory includes a heating, ventilation, and air condition (HVAC) compressor, a water pump, a brake air compressor, and a power steering pump.

11. The system of claim 8, wherein the controller is structured to facilitate power transmission from only the engine to the at least one accessory via the interface unit responsive to the energy data indicating the amount of energy in the energy storage device is below an energy threshold.

12. The system of claim 8, wherein the controller is structured to facilitate power transmission from both the accessory motor and the engine to the at least one accessory via the interface unit responsive to the engine data indicating a speed of the engine is below a speed threshold and the energy data indicating the amount of energy is at or above an energy threshold.

13. The system of claim 8, wherein the controller is structured to receive priority data and prioritize each accessory in the at least one accessory based on the priority data, wherein the controller is structured to facilitate power transmission to each accessory in a prioritized order defined by the priority data and responsive to the energy data and the engine data.

14. A method, comprising:
providing an interface unit coupled to both an engine and an accessory motor in a vehicle;
receiving, by a controller, engine data indicative of operation of the engine;
receiving, by the controller, energy data indicative of an amount of energy stored in an energy storage device, wherein the energy storage device is coupled to the accessory motor; and
controlling, by the controller, power transmission from at least one of the engine and the accessory motor via the interface unit to at least one vehicle accessory responsive to the engine data and the energy data, the controlling including facilitating power transmission from only the accessory motor to the at least one vehicle accessory via the interface unit responsive to the engine data indicating a speed of the engine is at or above a speed threshold for the engine.

15. The method of claim 14, further comprising facilitating, by the controller, power transmission from only the engine to the at least one vehicle accessory via the interface unit responsive to the energy data indicating the amount of energy in the energy storage device is below an energy threshold.

16. The method of claim 14, further comprising facilitating, by the controller, cessation of power transmission from both the accessory motor and the engine to the at least one vehicle accessory via the interface unit responsive to the engine data indicating the engine is in an OFF state and the energy data indicating the amount of energy in the energy storage device is below an energy threshold.

17. The method of claim 14,
wherein each one of the at least one vehicle accessory is mechanically-driven;
wherein the interface unit includes at least one of one or more belts and one or more gear trains, wherein the one or more belts or the one or more gear trains are structured to selectively couple to the at least one vehicle accessory; and
wherein the at least one vehicle accessory includes at least one of a heating, ventilation, and air condition (HVAC) compressor, a water pump, a brake air compressor, and a power steering pump.

18. An apparatus, comprising:
an engine module structured to interpret engine data indicative of operation of an engine;
an energy module structured to interpret energy data indicative of an amount of energy stored in an energy storage device, wherein the energy storage device is coupled to an accessory motor and structured to selectively power the accessory motor; and
an interface unit module structured to control power transmission from at least one of the engine and the accessory motor to at least one accessory via an interface unit responsive to the engine data and the energy data, wherein the interface unit module is further structured to facilitate power transmission from both the accessory motor and the engine to the at least one accessory via the interface unit responsive to the engine data indicating a speed of the engine is below a speed threshold and the energy data indicating the amount of energy is at or above an energy threshold; and wherein the interface unit is situated as an intermediary between the at least one accessory and each of the engine and the accessory motor.

19. An apparatus, comprising:
an engine module structured to interpret engine data indicative of operation of an engine;
an energy module structured to interpret energy data indicative of an amount of energy stored in an energy storage device, wherein the energy storage device is coupled to an accessory motor and structured to selectively power the accessory motor; and
an interface unit module structured to control power transmission from at least one of the engine and the accessory motor to at least one accessory via an interface unit responsive to the engine data and the energy data, wherein the interface unit module is structured to facilitate power transmission from only the accessory motor to the at least one accessory via the interface unit responsive to the engine data indicating the engine is in an OFF state and the energy data indicating the amount of energy stored in the energy storage device is at or above an energy threshold; and
wherein the interface unit is situated as an intermediary between the at least one accessory and each of the engine and the accessory motor.

20. An apparatus, comprising:
an engine module structured to interpret engine data indicative of operation of an engine;
an energy module structured to interpret energy data indicative of an amount of energy stored in an energy storage device, wherein the energy storage device is coupled to an accessory motor and structured to selectively power the accessory motor; and
an interface unit module structured to control power transmission from at least one of the engine and the accessory motor to at least one accessory via an interface unit responsive to the engine data and the energy data, wherein the interface unit module is structured to cease power transmission from both the accessory motor and the engine to the at least one accessory via the interface unit responsive to the engine data indicating the engine is in an OFF state and the energy data indicating the amount of energy in the energy storage device is below an energy threshold; and
wherein the interface unit is situated as an intermediary between the at least one accessory and each of the engine and the accessory motor.

21. An apparatus, comprising:
an engine module structured to interpret engine data indicative of operation of an engine;
an energy module structured to interpret energy data indicative of an amount of energy stored in an energy storage device, wherein the energy storage device is coupled to an accessory motor and structured to selectively power the accessory motor; and
an interface unit module structured to control power transmission from at least one of the engine and the accessory motor to at least one accessory via an interface unit responsive to the engine data and the energy data, wherein the interface unit module is structured to facilitate power transmission from the engine to the accessory motor via the interface unit to charge the energy storage device responsive to the energy data indicating the amount of energy in the energy storage device is at or below a discharge threshold, and wherein the interface unit module is further structured to continue power transmission from the engine to the interface unit to the accessory motor until the energy data indicates the amount of energy in the energy storage device is at or above a charge threshold; and
wherein the interface unit is situated as an intermediary between the at least one accessory and each of the engine and the accessory motor.

22. An apparatus, comprising:
an engine module structured to interpret engine data indicative of operation of an engine;
an energy module structured to interpret energy data indicative of an amount of energy stored in an energy storage device, wherein the energy storage device is coupled to an accessory motor and structured to selectively power the accessory motor; and
an interface unit module structured to control power transmission from at least one of the engine and the accessory motor to at least one accessory via an interface unit responsive to the engine data and the energy data, wherein the interface unit module is structured to facilitate power transmission from the accessory motor to the engine and to at least one accessory responsive to the engine data indicating the engine is transitioning from an OFF state to an ON state; and
wherein the interface unit is situated as an intermediary between the at least one accessory and each of the engine and the accessory motor.

23. A system, comprising:
an engine;
an accessory motor coupled to an energy storage device;
an interface unit coupled to each of the engine and the accessory motor, wherein the engine is not directly coupled to the accessory motor;
at least one accessory coupled to the interface unit; and
a controller communicably coupled to the engine, the accessory motor, the energy storage device, the interface unit, and the at least one accessory, wherein the controller is structured to:
receive engine data indicative of operation of the engine;
receive energy data indicative of an amount of energy stored in the energy storage device; and
selectively control power transmission from at least one of the engine and the accessory motor to the at least one accessory via the interface unit responsive to the engine data and the energy data;
wherein the controller is further structured to facilitate power transmission from both the accessory motor and the engine to the at least one accessory via the interface unit responsive to the engine data indicating a speed of the engine is below a speed threshold and the energy data indicating the amount of energy is at or above an energy threshold.

24. A system, comprising:
an engine;
an accessory motor coupled to an energy storage device;
an interface unit coupled to each of the engine and the accessory motor, wherein the engine is not directly coupled to the accessory motor;

at least one accessory coupled to the interface unit; and
a controller communicably coupled to the engine, the accessory motor, the energy storage device, the interface unit, and the at least one accessory, wherein the controller is structured to:
  receive engine data indicative of operation of the engine;
  receive energy data indicative of an amount of energy stored in the energy storage device; and
  selectively control power transmission from at least one of the engine and the accessory motor to the at least one accessory via the interface unit responsive to the engine data and the energy data;
wherein the controller is further structured to receive priority data and prioritize each accessory in the at least one accessory based on the priority data, wherein the controller is structured to facilitate power transmission to each accessory in a prioritized order defined by the priority data and responsive to the energy data and the engine data.

25. A method, comprising:
providing an interface unit coupled to both an engine and an accessory motor in a vehicle;
receiving, by a controller, engine data indicative of operation of the engine;
receiving, by the controller, energy data indicative of an amount of energy stored in an energy storage device, wherein the energy storage device is coupled to the accessory motor; and
controlling, by the controller, power transmission from at least one of the engine and the accessory motor via the interface unit to at least one vehicle accessory responsive to the engine data and the energy data, the controlling including facilitating cessation of power transmission from both the accessory motor and the engine to the at least one vehicle accessory via the interface unit responsive to the engine data indicating the engine is in an OFF state and the energy data indicating the amount of energy in the energy storage device is below an energy threshold.

* * * * *